Figures 1, 2:
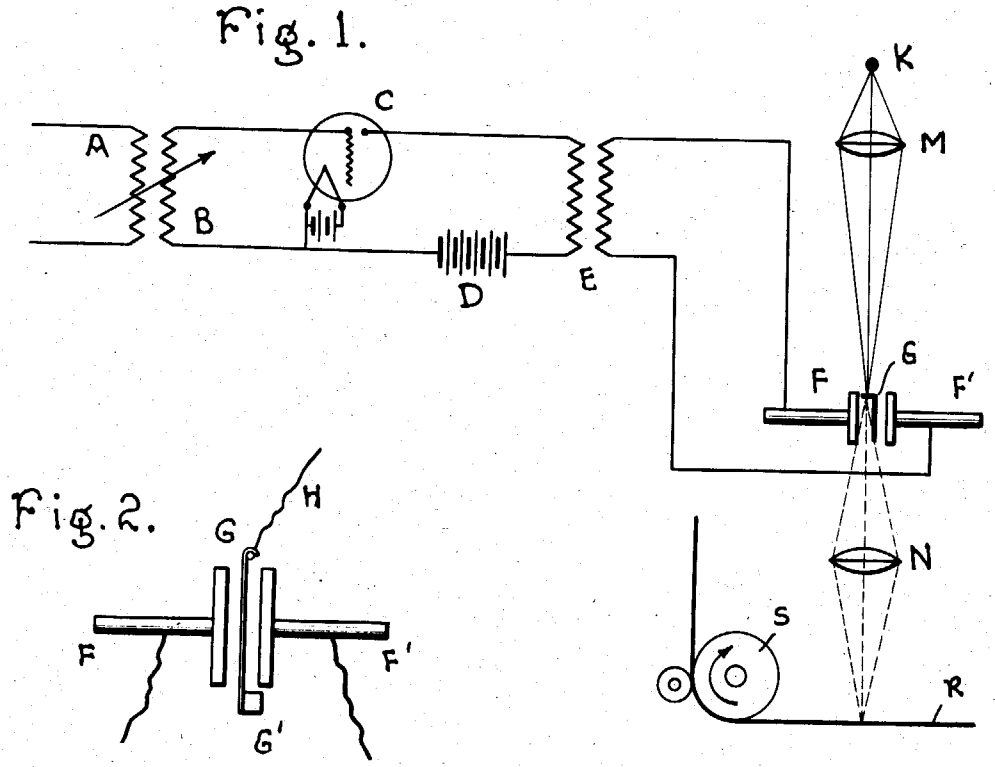

Feb. 21, 1928.

C. F. JENKINS

Re. 16,888

ELECTROSCOPE PICTURE RECEPTION

Original Filed Sept. 11, 1922

Inventor

CHARLES FRANCIS JENKINS

By Paul Carpenter

Attorney

Reissued Feb. 21, 1928. Re. 16,888

UNITED STATES PATENT OFFICE.

CHARLES FRANCIS JENKINS, OF WASHINGTON, DISTRICT OF COLUMBIA, ASSIGNOR TO JENKINS LABORATORIES, A CORPORATION OF DISTRICT OF COLUMBIA.

ELECTROSCOPE PICTURE RECEPTION.

Original No. 1,521,192, dated December 30, 1924, Serial No. 587,523, filed September 11, 1922. Application for reissue filed December 29, 1926. Serial No. 157,825.

This invention relates to the transmission of pictures-by-radio, and has for its principal object means for interrupting a source of light at the receiving station, in order to produce lights and shades and half-tones on the photographic surface upon which it impinges in the apparatus at the receiving station.

In the drawings herewith, Figure 1 is a diagrammatic illustration of the device, and Figure 2 a detail thereof, in both of which A is the primary of an induction coil, and part of the receiving apparatus; B the secondary of the same coil; C an amplifying tube, D a battery in the plate circuit of the tube; E an induction coil, the primary of which is in circuit with the plate, and the high tension secondary in circuit with the square plates F and F′. Between the two plates, an extremely light film member G is hung, on the support H (Fig. 2). K is a source of light, M a lens for gathering the diverging rays thereof and concentrating them onto the target G′ attached to the oscillating member G. The lens N is so located that one focus thereof is on the target G′, and the other focus is on a light-sensitive film R fed forward by the roller S.

The operation of the device is as follows: When fluctuating current representing the light values of a picture is sent out from the broadcasting station, it is picked up by the receiving station, and these fluctuating current values, passing through the low side primary of the induction coil E, induces in the secondary of the transformer E a high potential of alternating character. The effect is to charge the plates F and F′ positive and negative, respectively, and alternately. The oscillating member G being grounded, as, for example, on a water main, has but one sign, and, therefore, is attracted toward the plate which at the moment has the opposite sign, and is repelled from the plate which has the same sign. As the two plates F and F′ constantly change their sign, it is obvious that the member G continually oscillates as it hangs between these two plates and in amplitude in proportion to the current energy.

And as the light from the source K is directed onto the target G′, when the latter is in neutral position the light will be cut off at that point; but as the member G, and its attached target G′ oscillates, the light will pass onto the lens N, and thence to the film R in greater or lesser amount, as the oscillation of the member is great or small. The devices operate, therefore, as a light-interrupting shutter which permits light to pass in proportion to the energy of the plate charging current.

It is obvious that with the specific arrangement shown only a single line varying in density will be recorded on the film, but it is to be understood that the film and rotating drum are intended to represent any suitable arrangement for producing relative movement between the projected light and the light receiving surface, and it will be apparent to one skilled in the art that any one of several well known forms of apparatus may be used to distribute the light variations over the surface in proper order to reproduce the original picture or record.

While my invention is primarily intended to be used in transmitting pictures, it is obvious that it may be used for photographically recording any voltage of varying amplitude, whether it represents varying light values of a picture or sound variations in speech or music.

What I claim is:

1. In devices of the character described, a source of light, an electrostatically charged oscillating member so located as to intercept light from said source, the oscillation of the light intercepting member resulting from the member being electrically charged and permitting varying amounts of light to pass it.

2. In devices of the character described, a source of light, two electro-statically charged members in alignment with said light and an oscillating member so located there-between as to intercept light from said source, said oscillating member suspended between said electrostatically charged members and permitting varying amounts of light to pass it.

3. In devices of the character described, the combination of a source of light and an oscillating member in line with said light, and propelled by an electrostatically charged plate and so located as to vary the amount of the light passing said oscillating member.

4. In devices of the class described, the combination of a source of light, a pair of plates, means for potentially charging same, and an oscillating member propelled by said plates potentially charged alternately plus and minus, and so located as to vary the amount of the light passing said oscillating member.

5. In combination, a source of varying voltage, a source of light, a light receiving surface, and electro-static means controlled by said source of voltage and movable in the path of said light to intercept the light in accordance with the voltage variations and permit light of varying intensity to pass it for recording modulated values of light.

6. The combination of a source of varying voltage, a pair of spaced stationary plates connected to the terminals of said source, a movable member interposed between said plates and adapted to be moved by variations in voltage of said source, a source of light, a light receiving surface, and a light target carried by said movable member and movable in the path of said light to variably intercept said light for recording modulated values of light.

7. The combination of a source of varying voltage, a pair of spaced stationary plates connected to the terminals of said source, a movable member interposed between said plates and adapted to be moved by variations in voltage of said source, a light receiving surface, means for directing a beam of light upon said surface, and a light target carried by said movable member and arranged to normally intercept said beam but movable in response to changes in voltage to permit varying amounts of light to pass to said surface for recording modulated values of light.

In testimony whereof I affix my signature.

CHARLES FRANCIS JENKINS.